United States Patent
Sankrithi et al.

(10) Patent No.: US 7,717,372 B2
(45) Date of Patent: May 18, 2010

(54) REDUCED-PERIMETER AIRCRAFT

(75) Inventors: Mithra M. K. V. Sankrithi, Lake Forest Park, WA (US); Cameron Carnegie, Everett, WA (US); Kelly Boren, Marysville, WA (US); Peter Colebrook, Seattle, WA (US)

(73) Assignee: The Boeing Company, Chicago, IL (US)

( * ) Notice: Subject to any disclaimer, the term of this patent is extended or adjusted under 35 U.S.C. 154(b) by 353 days.

(21) Appl. No.: 11/764,021

(22) Filed: Jun. 15, 2007

(65) Prior Publication Data
US 2008/0308675 A1   Dec. 18, 2008

(51) Int. Cl.
*B64D 11/06* (2006.01)
(52) U.S. Cl. .................................. 244/118.6
(58) Field of Classification Search ............... 244/118.6, 244/118.5, 122 R; 296/64; 105/345; 297/232
See application file for complete search history.

(56) References Cited

U.S. PATENT DOCUMENTS

| | | | | |
|---|---|---|---|---|
| 2,332,841 A * | 10/1943 | Burton et al | ............. | 244/118.6 |
| 2,700,412 A * | 1/1955 | Evans et al. | .................. | 297/232 |
| 4,066,227 A * | 1/1978 | Buchsel | .................... | 244/118.6 |
| 4,936,620 A * | 6/1990 | Francois et al. | ................ | 296/64 |
| 5,451,377 A * | 9/1995 | Asher et al. | .................. | 428/167 |
| 6,012,679 A * | 1/2000 | Auestad | .................... | 244/118.6 |
| 6,739,552 B2 * | 5/2004 | Sankrithi et al. | ......... | 244/118.6 |
| 2007/0034742 A1 * | 2/2007 | Jaeger et al. | ............. | 244/118.6 |
| 2008/0042010 A1 * | 2/2008 | Watanabe | ................ | 244/118.6 |

\* cited by examiner

*Primary Examiner*—Tien Dinh
(74) *Attorney, Agent, or Firm*—Tung & Associates

(57) ABSTRACT

Aircraft that have fuselages including a series of frames spaced apart according to a frame pitch. The series of frames are covered by an aircraft skin to define an interior volume of the aircraft. The interior volume contains a series of rows of seats separated according to a seat pitch. The seat pitch may be indexed to the frame pitch such that seats are located between adjacent ones of the series of frames to permit a reduced-perimeter aircraft fuselage with substantially equal passenger comfort metrics. In some embodiments, in addition, a series of windows are located adjacent outboard seats of the series of rows of seats to permit ergonomically appropriate viewing through the series of windows by passengers seated in the outboard seats.

22 Claims, 6 Drawing Sheets

REDUCED-PERIMETER AIRCRAFT

TECHNICAL FIELD

The embodiments described herein generally relate to aircraft, and more particularly relate to passenger aircraft that have a reduced aircraft perimeter while substantially maintaining passenger comfort metrics in the cabin.

BACKGROUND

Aircraft design entails consideration of a myriad of details. A non-limiting list of some details includes size, capacity, weight, range, payload, speed, aerospace standards, airport limitations and governmental regulations. In one design aspect, it is generally accepted that aircraft weight (without payload) and aerodynamic drag correlate with aircraft fuselage surface area and correspondingly with aircraft cross sectional perimeter. It is desirable to reduce both weight and aerodynamic drag because greater aircraft weight and/or drag reduces payload and/or range, and higher aerodynamic drag in flight translates into higher fuel usage, and also translates into higher carbon dioxide emissions, all other factors being equal. Aerodynamic drag increases as the lateral cross sectional area increases because perimeter is related directly to cross sectional area for a fuselage shape. However, the larger the aircraft lateral cross sectional area, the more spacious the interior of the aircraft for passenger comfort. Accordingly, a balance is struck between interior space (which translates to cross sectional area) on the one hand and weight and aerodynamic drag on the other. With increasing fuel costs, reduction in aircraft fuselage perimeter and cross sectional area is becoming more desirable.

Aircraft cross sectional area correlates to the perimeter of the fuselage at any point along the length of the aircraft. Fuselage perimeter in turn correlates with the width of the fuselage. Accordingly, one approach to conserving fuel is to reduce fuselage width, while maintaining passenger comfort.

Typically, aircraft design commences with consideration of interior requirements such as number of aisles, number of seats and how these are grouped in rows and columns, service areas, storage areas (e.g., overhead bins), checked-in baggage compartments, and the like. Once the parameters defining these requirements have been met with an interior design, a fuselage may be designed to envelope the interior design. The fuselage is typically constructed with a fuselage skin structurally connected to a skeleton structure that includes a series of spaced-apart, hoop-shaped frames that define the aircraft cross section at locations along the length of the fuselage. Thus not all frames are identical; if the aircraft tapers from central section to tail section, for example, then frames near the center of the aircraft may be larger hoops and successive frames will decrease in hoop size and the hoop shape of the frame may also change, moving aft to the tail section. Frame spacing may vary, but is typically in the range 18 to 25 inches apart. These frames are covered with an aircraft skin, typically made up of skin panels, typically provided with adjacent stiffening stringers, to produce the outer shell of the fuselage that encloses the interior. Stringers or longerons may also be provided to act with the skin and frames. A cabin is formed inside the fuselage by supplying a floor, a ceiling and covering the interior sides of the fuselage with decorative interior panels.

An example of a prior art cabin interior 10, omitting the storage bins and areas above the ceiling and below the floor, is illustrated in lateral cross section in FIG. 1. The cabin 10 is surrounded by a fuselage 22 that is supported by hoop-shaped frames 20 that are 6 inches (152.4 mm) thick in this example. The seating in cabin 10 is laid out in a two-aisle (12, 14) arrangement. Seats 30, 32 are located at the right side of aisle 14, seats 33, 34 and 35 in the center, and seats 36, 37 that are located to the left of aisle 12. The most outboard seats, or "window seats," 32, 36 have 2 inch (5.1 mm) wide outboard armrests 40, each spaced a distance of 0.5 inches from the respective interior panels, 52, 56. In this case, the fuselage width 60 is 197 inches (500.4 mm) based on: frames 6 inches (152.4 mm) wide, seats 18.5 inches (47 mm) wide, adjacent seats 2 inches (5.1 mm) apart, armrests 2 inches (5.1 mm) wide, aisles 17.25 inches each, and seats 36 and 32 each spaced a distance 45 of 0.5 inches (6.3 mm) from its adjacent interior paneled surface 56 and 52, respectively. Variations are possible based on changes in aisle width, seat width, and other dimensions specified above.

Figure 1:
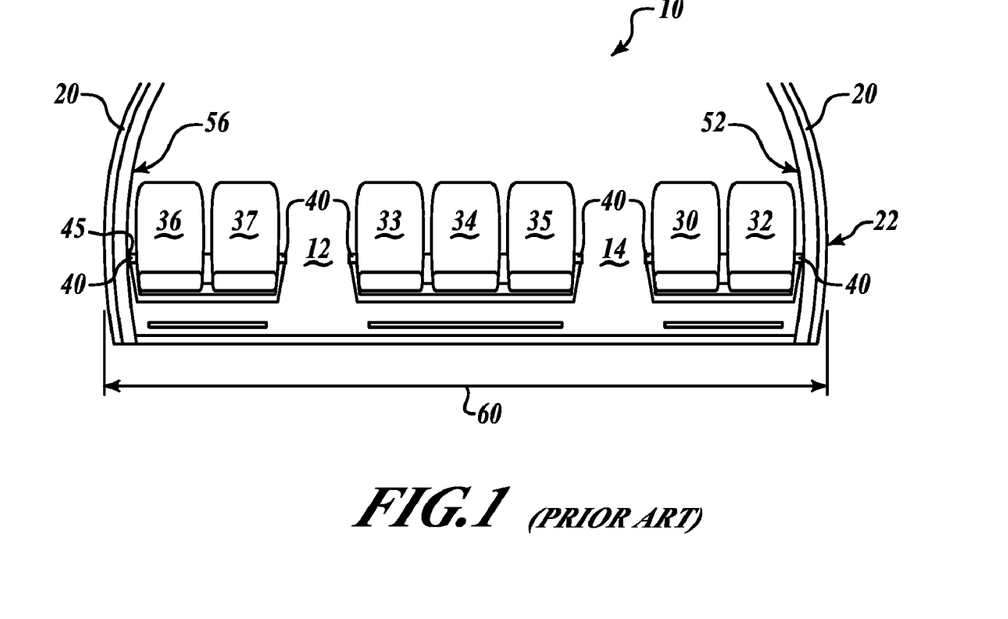
FIG. 1 is a cross sectional view of a portion of a prior art aircraft cabin interior.

While the interior design of FIG. 1 is efficient, it has disadvantages as well. For example, window spacing is determined by frame location because windows are located between adjacent frames. Typical frame pitch may be about 24 inches so that window pitch is also about 24 inches. But seat pitch may be 32 inches. As a result, when the seats are arranged independently of frame spacing limitations on window location, some passengers with "window seats" may not have a window located in an ergonomically appropriate location for viewing.

Accordingly, it is desirable to develop an aircraft fuselage that is more congruent with a selected interior design of the aircraft to provide a smaller fuselage perimeter as compared to the prior art. In addition, it is desirable to integrate the aircraft fuselage frame structure design with the interior design and window placement to provide a better passenger environment. Furthermore, other desirable features and characteristics of the reduced-perimeter aircraft will become apparent from the subsequent detailed description and the appended claims, taken in conjunction with the accompanying drawings and the foregoing technical field and background.

BRIEF SUMMARY

Exemplary embodiments provide an aircraft that has a fuselage that includes a series of frames spaced apart according to a frame pitch. The series of frames are covered by an aircraft skin to define an interior volume of the aircraft. The interior volume contains a series of rows of seats separated according to a seat pitch. The seat pitch is indexed to the frame pitch such that seats are located between adjacent frames.

Other exemplary embodiments include, in addition, a series of windows in at least a portion of the passenger cabin. The series of windows are located adjacent outboard seats to permit ergonomically appropriate viewing through the series of windows by passengers seated in the outboard seats.

Further exemplary embodiments provide an aircraft that has a fuselage that includes a series of frames spaced apart according to a frame pitch. The series of frames are covered by an aircraft skin to define an interior volume of the aircraft. The interior volume contains a series of rows of seats separated according to a seat pitch. Outboard seats have outboard armrests and the seat pitch is indexed to the frame pitch such that outboard seats are located between adjacent frames with the outboard armrests encroaching as far as possible into an inter-frame space consistent with meeting head impact criteria.

BRIEF DESCRIPTION OF THE DRAWINGS

Various embodiments will hereinafter be described in conjunction with the following drawing figures, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

In the specification and claims the following meanings apply to terms: the term "frame pitch" means the longitudinal spacing between adjacent frames, the term "seat pitch" means the longitudinal spacing between seats, rows of seats or seat modules arranged one behind the other in the aircraft cabin, and the term "window pitch" means the longitudinal spacing between adjacent windows. Further, the term "inboard" means closer to the longitudinal center plane of an aircraft fuselage, while the term "outboard" means farther from the longitudinal center plane of an aircraft fuselage.

Examples of embodiments provide single or multi-aisle aircraft passenger compartments in a reduced-perimeter, enhanced-comfort fuselage. The reduced perimeter enables reduced fuselage weight, reduced fuselage drag and improved or maintained comfort metrics. In addition, in exemplary embodiments window pitch may also be indexed to frame pitch and outboard seat module pitch to position "window seat" (typically the farthest outboard seats) passengers more appropriately relative to windows for ease of viewing. Further, in some exemplary embodiments, interior panels may be sculpted and aligned to minimize panel intrusion into the cabin space and maximize passenger space consistent with any regulations that may apply.

While the specification and claims may refer to aircraft having "a reduced fuselage perimeter," much of the following discussion focuses on fuselage width for ease of description because fuselage width correlates to fuselage perimeter. Accordingly, a reduction in fuselage width allows a reduction in fuselage perimeter, with or without corresponding reduction in fuselage height.

As a preliminary matter, the transition to more extensive use of composite materials in the airframe, fuselage, wings, rudder assembly and skin panels of more recent large commercial aircraft, like the Boeing 787™ (787 and BOEING are trademarks of The Boeing Company, Chicago, Ill.), presents an opportunity to redesign the airframe structure. According to exemplary embodiments using composites frames and skins, frame pitch may be increased and selected to be in the range from about 28 to 38 inches (71.1 to 96.5 mm) without significant adverse weight consequences. Exemplary embodiments of the seat pitch may range from about 28 to about 38 inches (71.1 to 96.5 mm), or more.

According to exemplary embodiments, when the composite frame pitch is indexed to the seat pitch that is specified by the aircraft interior design, the frame spacing is an integer multiple of the seat pitch. Thus, for example, the frame pitch (FP) may be selected to be 1×SP, 2×SP, or 3×SP, where SP=seat pitch. Most typically, FP=SP.

According to exemplary embodiments, window pitch (WP) is indexed to composite frame pitch and implicitly, therefore, to seat pitch. Most typically, window pitch equals frame pitch, if frame pitch equals seat pitch. But, for example, if frame pitch is twice seat pitch, the window pitch is 0.5 times the frame pitch. In other words, to ensure that each window seat has the most appropriately placed adjacent window, window pitch equals seat pitch, in most embodiments, unless passenger window views are not a significant consideration.

Figure 2:
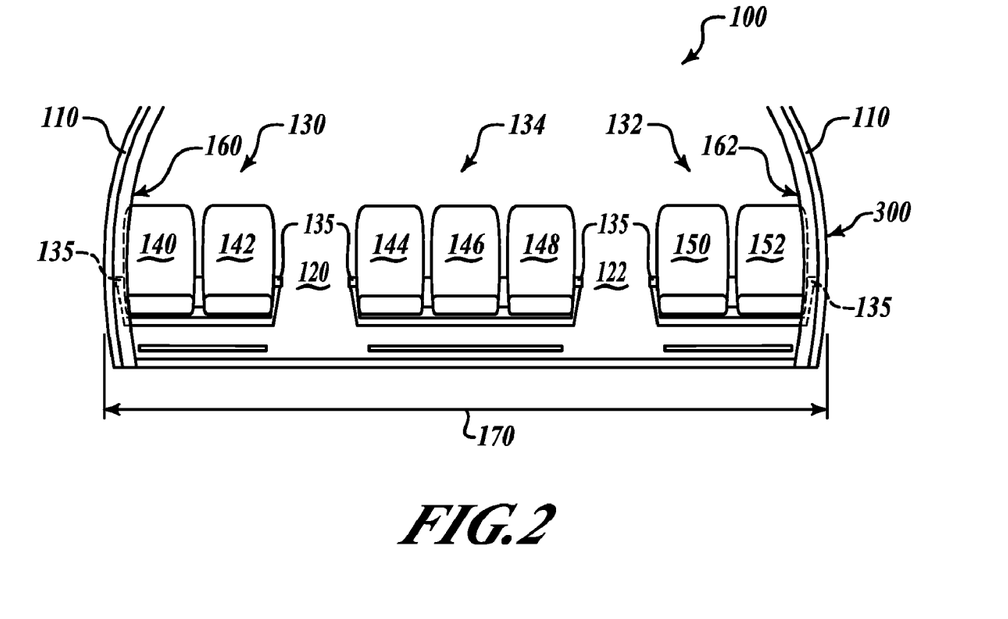
FIG. 2 is cross sectional view of an exemplary embodiment of a portion of a passenger cabin interior of an aircraft with a reduced perimeter size.
Figure 3:
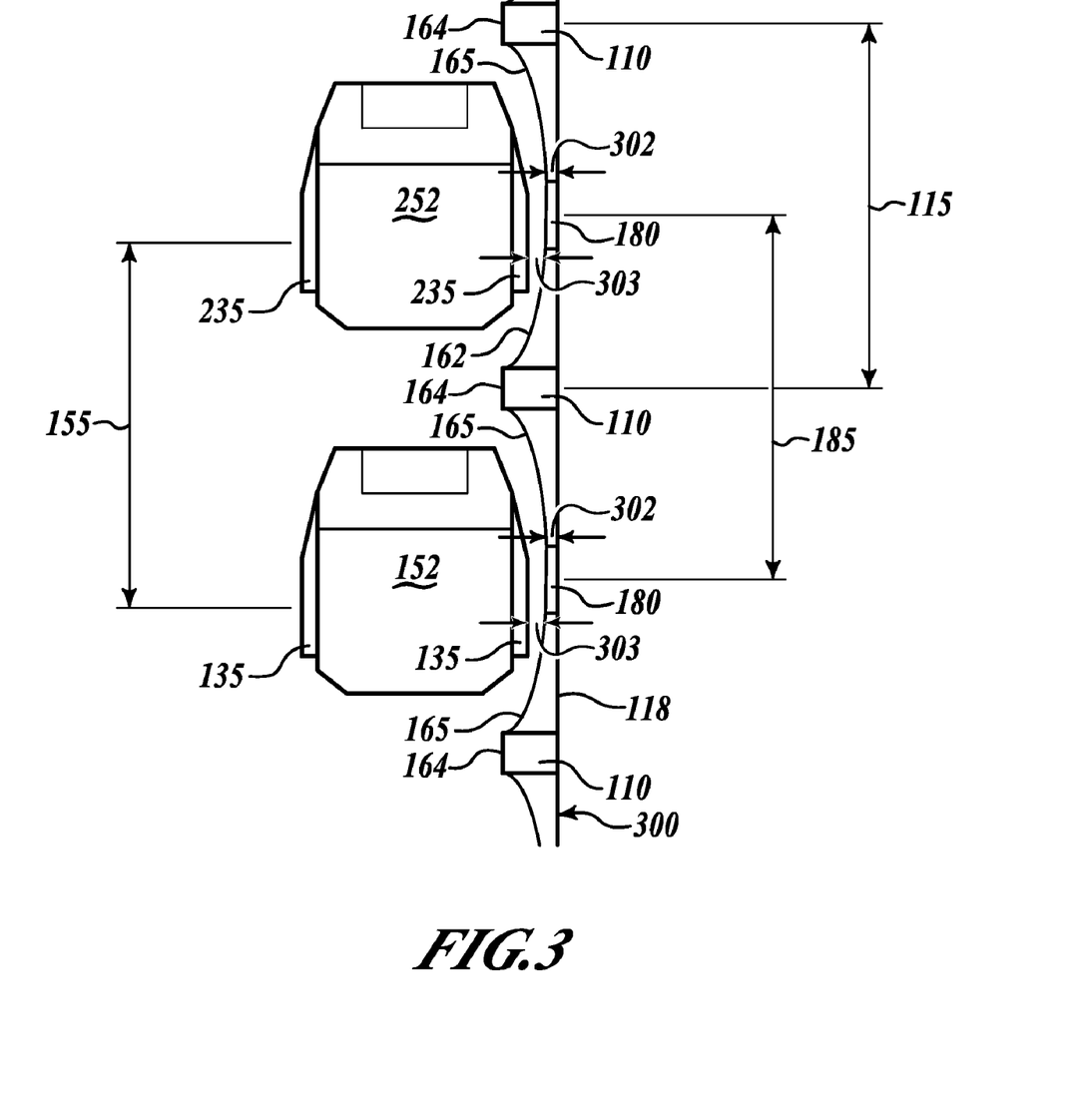
FIG. 3 is a top view of an outboard portion of the exemplary embodiment of FIG. 2
Figure 4:
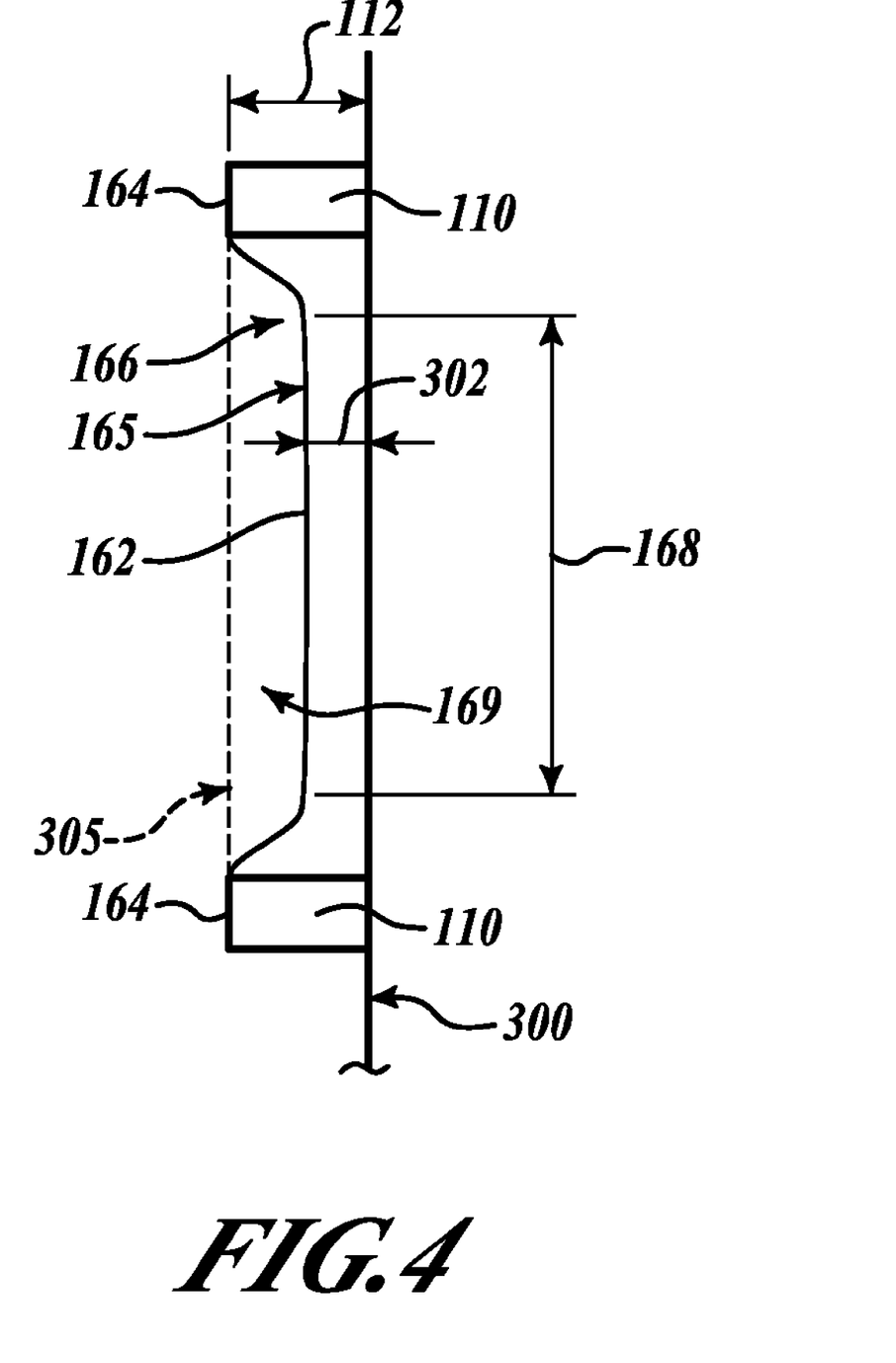
FIG. 4 is a top view of an outboard portion of FIG. 2 illustrating the inter-frame space in more detail.

FIGS. 2, 3 and 4 illustrate an exemplary embodiment of an aircraft cabin 100 in a reduced-perimeter aircraft fuselage 300. The fuselage 300 has a fuselage width 170 of 191 inches (485.1 mm) as compared to 197 inches (500.4 mm) in the prior art cabin of FIG. 1 while maintaining passenger comfort metrics such as seat width, seat lateral spacing and aisle width.

The cabin 100 of FIG. 2 is surrounded by hoop-shaped frame 110 and is multi-aisled having a left aisle 120 and a right aisle 122. Left aisle 120 is flanked by outboard seat module 130 and center seat module 134, while right aisle 122 is flanked by center seat module 134 and outboard seat module 132. The outboard seat module 130 includes a pair of seats 140, 142. Seat 140 is the window seat adjacent the interior panel 160 and a window (not shown). Likewise, outboard seat module 132 includes a pair of seats 150, 152, where seat 152 is the window seat adjacent the interior panel 162 and a window 180, shown in FIG. 3. Each of the outboard or window seats 140, 152 have outboard armrests 135 spaced a small clearance distance 303 from adjacent interior panels 160, 162, respectively. The center module includes three seats 144, 146, and 148. The three seat modules 130, 132 and 134 may be laterally aligned with each other, or the center seat module 134 may be displaced forward or rearward of the outboard seat modules 130, 132. The center seat module 134 need not necessarily be indexed to the frame pitch. This provides added flexibility to airlines to customize seating arrangements in a multi-aisle aircraft that has at least one center seat module. However, the outboard seat modules 130, 132 are desirably aligned with each other laterally for ease of seat indexing with the frame pitch.

Referring to FIG. 3, outboard seat 252 with armrests 235 is located behind outboard seat 152 and is spaced from outboard seat 152 by the seat pitch 155. Frames 110 are separated by frame pitch 115 so that outboard seats 152 and 252 are centered between the frames 110. As a result, outboard seats 152, 252 do not abut the frames 110 but are in the spacing between successive frames 110. Accordingly, the indexing of frame pitch 115 to seat pitch 155 presents an opportunity to reduce the fuselage width 170 of the fuselage 300 as compared to the exemplary aircraft of FIG. 1 where the frames 20 abut the outboard seats 32, 36.

FIGS. 3 and 4 illustrate an example of interior panels 162 sculpted to reduce the spacing 302 between the fuselage 300 and the panel to about 3.0 inches. Of course, this sculpting applies to interior panels 160 on the other side of the aircraft as well. Further, other forms of sculpting may also be used. As seen more clearly in FIG. 4, the interior panel 162 has points of attachment 164 to adjacent spaced-apart frames 110 and spans the pitch 115 between the frames 110. The interior panel surface 165 curves sharply outboard, i.e. toward the fuselage 300, in curved region 166 to encroach into the inter-frame space 169 that is defined by the frames 110, the fuselage 300, and the dashed line 305 connecting inboard extremities of adjacent frames 110. The frames may be from about 3 inches (76 mm) to about 13 inches (330 mm) thick or wide (i.e., the extent to which the frames extend inboard as shown by numeral 112 in FIG. 4). Thus frame width 112 defines the width of the inter-frame space 169. The extent of seat outboard encroachment into the inter-frame space 169 may vary but, in exemplary embodiments, the clearance distance 302 between the flat portion 168 of the interior panel surface 165 and the fuselage is about 50% of the width or thickness 112 of frames 110. Other degrees of encroachment into the inter-frame space 169 are also useful and possible, taking into account space requirements for stringers, insulation and other components, and any regulations and other criteria that may apply. Clearly, the larger the degree of such encroachment, the greater the potential for fuselage width and perimeter reduction. The degree of encroachment may be limited by other considerations, discussed here below.

In exemplary embodiments, the cabin interior 100 may capture about 3 inches on each side by encroachment into the inter-frame space 169 defined above, as a result of the sculpting of interior panels 160, 162. The outboard seats 140, 152, or at least a portion of their respective outboard armrests 135, are partially recessed into the inter-frame space 169 but any decrease in passenger comfort metrics may be substantially if not completely offset by interior panel sculpting.

As a comparative example, taking the metrics of FIG. 1 and applying these to FIG. 2, assuming 6 inch thick frames and a 50% encroachment into the inter-frame space, the fuselage width 170 is reduced to 191 inches (485.1 mm) from the 197 inches (500.4) in FIG. 1. This reduction of 6 inches (15.3 mm) is significant. (The relevant metrics are: seat width 18.5 inches (47 mm), adjacent seats 2 inches (5.1 mm) apart, armrests 2 inches (5.1 mm) wide, aisles 17.25 inches wide, seats 152 and 140 each spaced 0.5 inches (6.3 mm) from their respective adjacent interior panels 162 and 160, and the minimum spacing between interior panels and fuselage exterior is 3 inches (76.2 mm).)

In a non-limiting example, an embodiment may include seats in a plurality of successive rows spaced apart by a seat pitch 155 of 32 inches. Of course other embodiments may have seat pitches in the range from about 28 to about 38 inches or greater. In the exemplary embodiment, the frame pitch 115 may also be 32 inches to equal the seat pitch. A window 180 may be inserted between the spaced-apart frames 110, as shown in FIG. 3, at a location that is ergonomically appropriate for passengers seated in outboard seats 152, 252. Thus, window pitch 185 may be indexed to equal the 32 inch seat pitch 155 and the frame pitch 115, in this example. Of course, other embodiments may have different dimensions.

Figure 5:
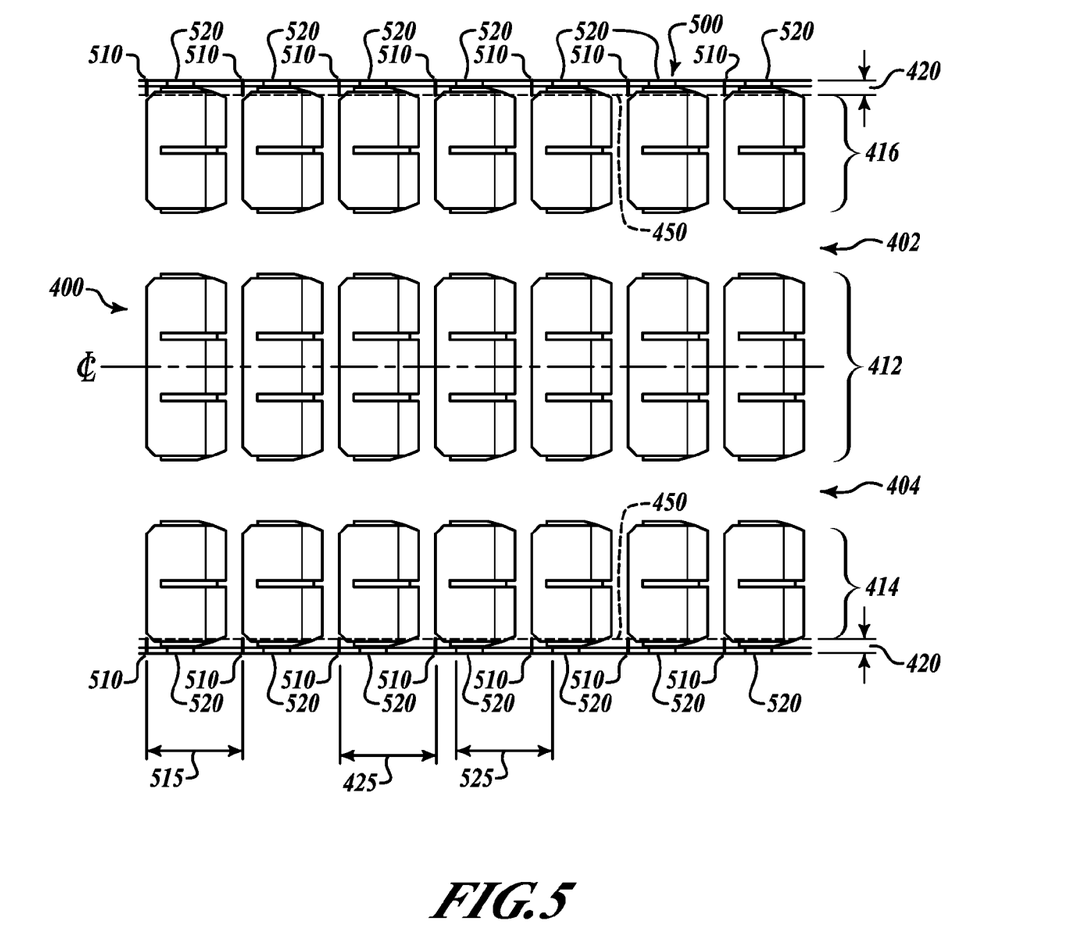
FIG. 5 is a plan view of an exemplary embodiment of a cabin interior of an aircraft with a reduced perimeter size.
Figure 6:
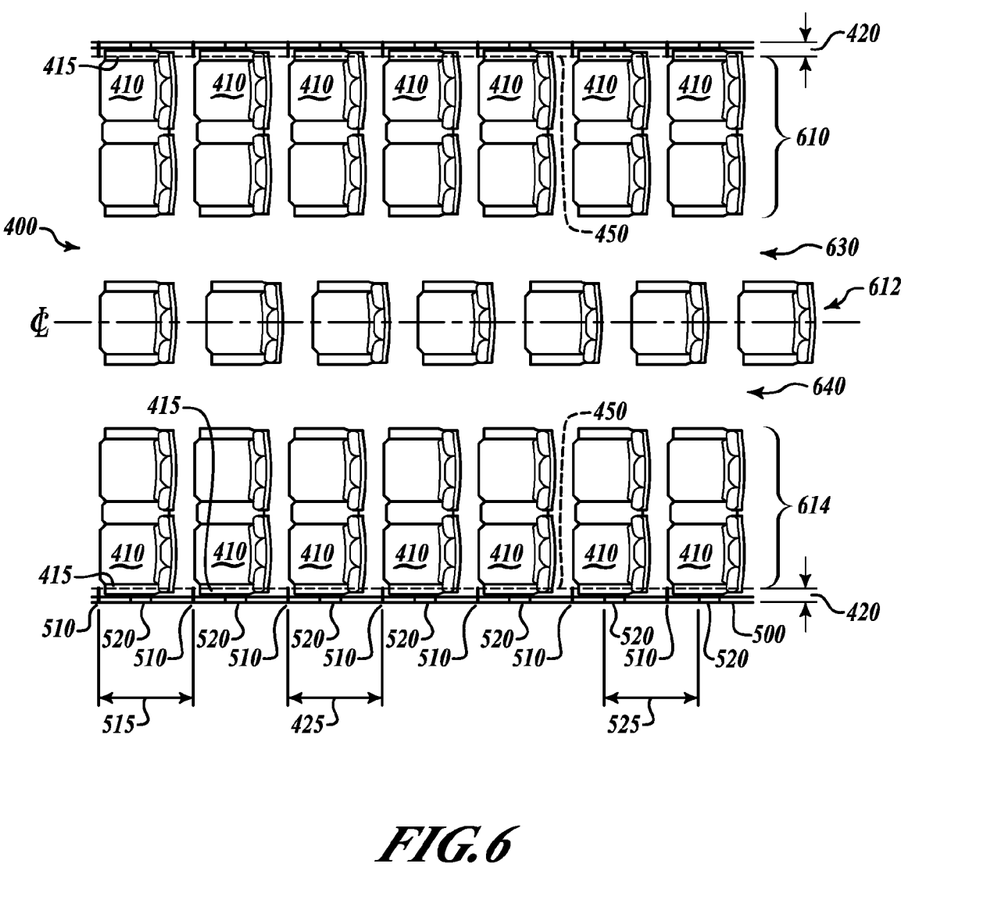
FIG. 6 is a plan view of another exemplary embodiment of a cabin interior of an aircraft with a reduced perimeter size.

FIG. 5 illustrates an example of a cabin section 400 surrounded by a fuselage section 500 that is supported by a series of spaced-apart frames 510. The cabin section 400 includes two aisles: aisle 402 and aisle 404. Cabin section 400 also has three seating modules: a center three-seat seating module 412 and outboard two-seat seating modules 416 and 414. While the center three-seat seating module 412 is shown aligned with the two-seat outboard seating modules 416, 414 in this example, it may be displaced fore or aft relative to the two-seat outboard seating modules 416, 414. Further the number of seats in each module may vary so that an outboard module may have from one to three seats while the center module has two to five seats, for example. Or, the outboard seat modules may be two-seat modules, while the center module has only one seat as shown in FIG. 6. In FIG. 5, the seat pitch 425 of the two-seat outboard modules 416, 414 may equal the frame pitch 515. The windows 520 are located between the frames 510 for appropriate ergonomics for passenger viewing. The window pitch 525 equals the frame pitch 515 and the seat pitch 425. Further, the interior panels 450 are sculpted outboard from the cabin to encroach into the inter-frame space 420 between the frames 510 (as explained with respect to FIG. 3, above) to maximize or increase available space in cabin section 400 within the reduced perimeter aircraft fuselage 500.

FIG. 6 illustrates another non-limiting example of an embodiment of a cabin section 400 of an aircraft with a reduced-perimeter fuselage 500 that may include economy class, first class, business class and premium economy class seating. The section of fuselage 500 includes a series of equally-spaced (i.e. constant frame pitch 515) frames 510 with windows 520 located between each adjacent pair of frames 510 at a location that is ergonomically appropriate for seated passenger viewing. The windows 520 are therefore at a window pitch 525 that may equal the frame pitch 515. Inside the cabin section 400, seats are arranged in three seat modules: a single-seat central seat module 612 flanked by a pair of two-seat outboard seat modules 610, 614. The cabin section 400 has a pair of aisles 630, 640 flanking the single-seat central seat module 612. Outboard seats 410 have outboard armrests 415 that may be spaced from interior panels 450 by a small clearance distance (not shown). The interior panels 450 are sculpted to encroach into the longitudinal inter-frame space 420 between successive frames 510 so that at least a portion of outboard regions of the seats 410, or at least a portion of the outboard armrests 415, are within the inter-frame space 420. This exemplary design reduces aircraft fuselage width while maintaining cabin passenger comfort metrics.

Figure 7:
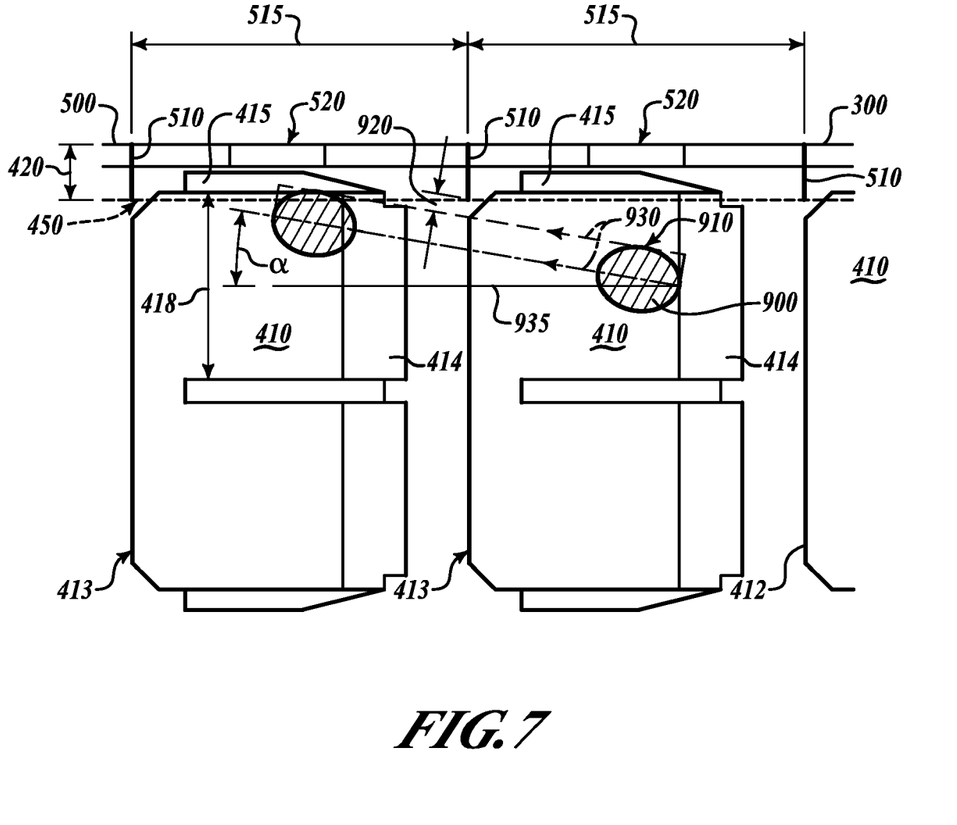
FIG. 7 is a plan view illustrating "Head Impact Criteria" an exemplary embodiment of a cabin interior of an aircraft with a reduced perimeter size

Passenger comfort and safety is also maintained in the exemplary embodiments and may in certain embodiments limit the extent to which the outboard seats or armrests may encroach into the inter-frame space. Head Impact Criteria (HIC) for Certification are met in the exemplary embodiments. HIC are set forth in FAR Sec. 25.562 "Emergency Landing Conditions." In the exemplary embodiment of FIG. 7, frames 510 are ideally located proximate a leading edge 413 of the outboard or window seats 410. The example is specific as to dimensions, but a suitable selection of other dimensions will also yield a result that meets the HIC. In this example dimensions are as follows: the seat width 418 is about 18 inches, the armrests 415 are 2 inches wide, the frames are 6 inches thick and the armrest 415 encroaches 3 inches into the inter-frame space 420. The passenger is seated in the center of the outboard or window seat 410 with head against headrest 414, According to HIC, a passenger (head shown as 900) seated on window seat 410 may be expected to move either directly forward along line 935 upon sudden deceleration or it is assumed that the passenger head 900 may deflect through an angle α to line 935, along a path defined by lines 930. When the center of the head 900 of the passenger moves through the path shown by parallel lines 930, at the maximum angle α of 10°, the head 900 does not impact the frame 510 immediately in front of the passenger's head 900. The path of the outboard side 910 of the passenger's head 900 clears the frame 510 by a clearance distance 920 of 1.8 inches. Accordingly, the design meets present HIC certification requirements of FAR Sec 25.562.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An aircraft comprising:
   a fuselage comprising a series of frames, the series of frames spaced apart according to a frame pitch, the series of frames covered by an aircraft skin to define an interior volume of the aircraft; and
   a series of rows of seats located in the interior volume of the aircraft, the series of rows of seats separated according to a seat pitch, the seat pitch indexed to the frame pitch such that seats are located between adjacent ones of the series of frames;
   wherein said seat pitch indexed to the frame pitch provides a reduction in an aircraft perimeter by at least partial encroachment of outboard seats of one of said series of rows of seats into an inter-frame space, said encroachment while maintaining seat width, lateral seat spacing, and aisle width of said rows of seats.

2. The aircraft of claim 1, wherein the interior volume of the aircraft comprises a passenger cabin, the passenger cabin comprising interior panels, the interior panels attached to the series of frames and sculpted to encroach outboard into said inter-frame space.

3. The aircraft of claim 1, wherein the outboard seats comprise outboard armrests, the outboard armrests encroaching at least partially outboard into the inter-frame space.

4. The aircraft of claim 1, wherein each frame is located between adjacent ones of the series of seats at specific longitudinal locations, each frame at said specific longitudinal location with sufficient longitudinal displacement from the longitudinal location of a widest portion of the head of an occupant seated at a seat reference point when said occupant is in a posture with torso and head bent fully forward from the seat reference point with 10 degrees of outboard yaw, said seat reference point comprising a longitudinal location of a point on the seat where an occupant settles into the seat and takes into account seat cushion deformation, said occupant seated with seat belt properly positioned and secured in an outboard seat immediately behind said frame, wherein when said occupant is in a posture with torso and head bent fully forward from said seat reference point with 10 degrees of outboard yaw, said sufficient longitudinal displacement ensures a nonzero longitudinal clearance between an outboard side of said widest portion of the head and said frame.

5. The aircraft of claim 3, wherein the outboard armrests encroach into at least about 50% of a width of the inter-frame space.

6. The aircraft of claim 1, further comprising windows in the fuselage, the windows located at a window pitch relative to each other.

7. The aircraft of claim 6, wherein the window pitch is substantially equal to the seat pitch.

8. The aircraft of claim 6, wherein the window pitch is selected to ensure ergonomically appropriate viewing through the windows by passengers seated in outboard seats.

9. The aircraft of claim 1, wherein the fuselage comprises a first composite material.

10. The aircraft of claim 1, wherein the series of rows of seats comprise at least three seating modules with an aisle inboard of each of outboard ones of the three seating modules.

11. The aircraft of claim 1, wherein the frame pitch is about 28 to about 38 inches and the seat pitch is about 28 to about 38 inches.

12. A reduced fuselage perimeter aircraft comprising:
   a composite fuselage comprising a series of composite frames, the series of composite frames spaced apart according to a frame pitch, the series of composite frames covered by a composite aircraft skin to define an interior volume of the reduced fuselage perimeter aircraft;
   a series of rows of seats located in a passenger cabin disposed within the interior volume of the reduced fuselage perimeter aircraft, the series of rows of seats comprising outboard seats comprising outboard armrests, the series of rows of seats separated according to a seat pitch, the seat pitch indexed to the frame pitch such that seats are located between frames and the outboard armrests on the outboard seats encroach at least partially into an inter-frame space; and
   a series of windows in at least a portion of the passenger cabin, the series of windows located adjacent outboard seats of the series of rows of seats to permit ergonomically appropriate viewing through the series of windows by passengers seated in the outboard seats;
   wherein said seat pitch indexed to the frame pitch provides a reduction in an aircraft perimeter by said encroachment into an inter-frame space, said encroachment while maintaining seat width, lateral seat spacing, and aisle width of said rows of seats.

13. The aircraft of claim 12, wherein each frame is located between adjacent ones of the series of seats at specific longitudinal locations, each frame at said specific longitudinal location with sufficient longitudinal displacement from the longitudinal location of a widest portion of the head of an occupant seated at a seat reference point when said occupant is in a posture with torso and head bent fully forward from the seat reference point with 10 degrees of outboard yaw, said seat reference point comprising a longitudinal location of a point on the seat where an occupant settles into the seat and takes into account seat cushion deformation, said occupant seated with seat belt properly positioned and secured in an outboard seat immediately behind said frame, wherein when said occupant is in a posture with torso and head bent fully forward from said seat reference point with 10 degrees of outboard yaw, said sufficient longitudinal displacement ensures a nonzero longitudinal clearance between an outboard side of said widest portion of the head and said frame.

14. The aircraft of claim 12, wherein the outboard armrests encroach into at least about 50% of a width of the inter-frame space.

15. The aircraft of claim 12, wherein sides of the passenger cabin comprise interior panels, the interior panels sculpted to encroach into the inter-frame space.

16. The aircraft of claim 12, wherein, in at least a portion of the passenger cabin, the frame pitch equals the seat pitch.

17. The aircraft of claim 16, wherein the frame pitch is between about 28 to about 38 inches.

18. The aircraft of claim 16, wherein in at least a portion of the passenger cabin the series of windows are spaced apart by a window pitch, and the window pitch substantially equals the seat pitch.

19. The aircraft of claim 12, wherein the frame pitch is about 28 to about 38 inches and the seat pitch is about 28 to about 38 inches.

20. A reduced fuselage perimeter aircraft comprising;
a composite fuselage comprising a series of composite frames, the series of composite frames spaced apart according to a frame pitch, the series of composite frames covered a composite aircraft skin to define an interior volume of the aircraft; and
a series of rows of seats spaced apart according to a seat pitch and located in a passenger cabin, the passenger cabin disposed within the interior volume of the aircraft, the series of rows of seats comprising outboard seats having outboard armrests, the seat pitch indexed to the frame pitch such that outboard seats are located between adjacent frames with the outboard armrests encroaching into an inter-frame space; and,
wherein each frame is located between adjacent ones of the series of seats at specific longitudinal locations, each frame at said specific longitudinal location with sufficient longitudinal displacement from the longitudinal location of a widest portion of the head of an occupant seated at a seat reference point when said occupant is in a posture with torso and head bent fully forward from the seat reference point with 10 degrees of outboard yaw, Said seat reference point comprising a longitudinal location of a point on the seat where an occupant settles into the seat and takes into account seat cushion deformation, said occupant seated with seat belt properly positioned and secured in an outboard seat immediately behind said frame, wherein when said occupant is in a posture with torso and head bent fully forward from said seat reference point with 10 degrees of outboard yaw, said sufficient longitudinal displacement ensures a nonzero longitudinal clearance between an outboard side of said widest portion of the head and said frame;
wherein said seat pitch indexed to the frame pitch provides a reduction in an aircraft perimeter by said encroachment into an inter-frame space, said encroachment while maintaining seat width, lateral seat spacing, and aisle width of said rows of seats.

21. The aircraft of claim 20, wherein sides of the passenger cabin comprise interior panels, the interior panels sculpted to encroach into the inter-frame space.

22. The aircraft of claim 20, wherein the frame pitch is between about 28 to about 38 inches and the seat pitch is about 28 to about 38 inches.

* * * * *